US005954916A

United States Patent [19]

Orlandi

[11] Patent Number: 5,954,916

[45] Date of Patent: Sep. 21, 1999

[54] ADHESIVE TAPE APPLYING DEVICE INCLUDING PRINTING SYSTEMS FOR PRINTING ON THE OUTER SURFACE OF THE TAPE

[76] Inventor: Roberto Orlandi, c/o SIMI S.R.L., Via Trento, 66/F, 20059 Vimercate, Milan, Italy

[21] Appl. No.: 08/987,069

[22] Filed: Dec. 8, 1997

[30] Foreign Application Priority Data

Nov. 24, 1997 [EP] European Pat. Off. .............. 97830617

[51] Int. Cl.$^{6}$ ...................................................... B32B 31/00

[52] U.S. Cl. .......................... 156/386; 156/385; 156/522; 156/527; 156/577; 156/579

[58] Field of Search .................................... 156/384, 385, 156/386, 387, 510, 522, 523, 527, 574, 577, 579

[56] References Cited

U.S. PATENT DOCUMENTS

| | | | |
|---|---|---|---|
| 3,951,726 | 4/1976 | Found | 156/527 |
| 4,094,724 | 6/1978 | Sato | 156/384 |
| 4,560,087 | 12/1985 | Sato et al. | 221/73 |
| 4,724,034 | 2/1988 | Becker | 156/384 |
| 4,853,068 | 8/1989 | Becker | 156/384 |
| 5,655,450 | 8/1997 | Hermann | 101/288 |

*Primary Examiner*—James Sells
*Attorney, Agent, or Firm*—Bucknam and Archer

[57] ABSTRACT

An improved device for applying an adhesive tape, provided with printing systems for printing on the outer surface of the tape, comprises a handle coupled to a frame bearing a supporting element for a tape roll and cutting means for cutting the tape, the handle also defining the path of the tape toward the applying point thereof. Above the tape applying point is provided at least a pressing roller contacting the outer surface devoid of adhesive of the tape, the pressing rollers comprising on the outside thereof printing characters which are suitably inked by inking means supported by the frame.

12 Claims, 4 Drawing Sheets

ADHESIVE TAPE APPLYING DEVICE INCLUDING PRINTING SYSTEMS FOR PRINTING ON THE OUTER SURFACE OF THE TAPE

BACKGROUND OF THE INVENTION

The present invention relates to an improved adhesive tape applying device including printing systems for printing on the outer surface of the tape.

In making packages for different applications, it is conventionally necessary to use large amounts of adhesive tapes for safely sealing the package being made.

Moreover, it is frequently required or necessary to use the mentioned tape as a carrier for concise written information, which may be useful for the sending or receiving party. Such information can be related to the characteristics of the package contents indicated, for example, by the words "BRITTLE" or "INFLAMMABLE", of the sender of the package, indicated by writing or printing the name and business place of the sending Company, the destination place, usually indicated by wordings such as "MILAN" or "NEW YORK", as well as the products held in the package or other different information.

Prior adhesive tape application devices usually comprise a handle supporting a frame housing an adhesive tape roll and defining the unwinding path of the tape up to the application point thereof, thereon are conventionally provided, fixed to the mentioned frame, one or more pressing elements of substantially cylindrical shape, allowing the adhesive tape to be unwound under a suitable tension. Finally, for cutting the adhesive tape, one or more saw elements suitably arranged on the mentioned frame above the pressing elements are usually provided.

For applying the adhesive tape, an operator grips the adhesive tape applying device and, by a slight pressure provided by a hand engaging the handle, holds the pressing roller and adhesive tape in contact with the package to be sealed.

Then, by exerting a pulling force, the operator causes the adhesive tape to be unwound so as to close the package as desired. Finally, the adhesive tape is cut by a suitable cutter, while being guided by a suitable movement of the wrist.

Other adhesive tape applying devices are moreover known, similar to the above disclosed devices which, however, further comprise a printing device for printing on the inner surface of the adhesive tape, i.e. the surface of the tape on which the adhesive material is applied: in this case the used tape is clear and always of the same type.

Even if the above prior devices have been found suitable to solve the mentioned technical problem, they, however, were affected by the following disadvantages.

The adhesive tape rolls used in the first mentioned devices are of different types and nature, and each whereof has dedicated written characters. Accordingly, they are affected by storing problems, since they must always supply and store different adhesive tapes, with a consequent increase of the processing and managing costs.

Moreover, the wordings applied on said prior adhesive tapes are made of specifically designed highly expensive inks, since said wordings must be indelible and easily readable even if the tapes are stretched for a proper application thereof.

On the other hand, the adhesive tapes the inner surface (i.e. the adhesive coated surface) of which is printed upon in the tape application step, have a poor printing quality, because they directly contact the package and due to a possibly not perfectly dried ink, which conditions are further aggravated by the pulling friction of the adhesive tape on the package as the tape is applied In addition, the ink applied to the tape will require a comparatively long time for fully drying, due to a lacking of any specifically provided drying ventilations.

Thus, in this time period, accidental pressures applied to the tape would hinder a proper readability of the tape printed material.

SUMMARY OF THE INVENTION

Accordingly, the aim of the present invention is to overcome the above mentioned drawbacks affecting the prior art.

In order to achieve this aim, the invention provides an improved adhesive tape application device, including printing systems for printing on the outer surface of the tape, which is simple construction-wise, of small cost, very practical in operation and allows a great reduction of the packaging process time.

Briefly, according to the invention, an improved device is herein disclosed for applying an adhesive tape, said device including printing systems for printing on the outer surface of the adhesive tape, comprising a handle coupled to a frame, bearing a supporting element for an adhesive tape roll and cutting means for cutting said adhesive tape, while defining the path of said adhesive tape toward an application point thereof, wherein, above said application point, at least a pressing roller is provided, said pressing roller contacting the adhesive-free outer surface of said tape, including on the outside thereof printed characters, and suitably inked by inking means supported by the frame.

The improved adhesive tape applying device, including printing systems for printing on the outer surface of the adhesive tape, according to the invention, provides the following advantages.

It is possible to use clear or colored adhesive tapes, made of polyvinylchloride or polypropylene both with a solvent adhesive and a water adhesive, while providing a quicker and more efficient control of the adhesive tape storing means as well as a much more unexpensive supplying of the adhesive tapes.

The printing material printed on the tape has a very good quality, without stains and blurs.

Moreover, since the printing is performed on the outer surface of the tape, i.e. the adhesive free surface thereof, the printed material will remain in contact with air, thereby providing a quick drying.

The characters to be printed can be changed at will, by simply and quickly replacing the printing plate or cliché, thereby it will be possible to simply and economically print any desired printed material.

In addition, the construction of the inventive device is very simple, thereby said device can be easily made in series at a low cost.

BRIEF DESCRIPTION OF THE DRAWINGS

Further characteristics, advantages and constructional details of the improved adhesive tape applying device, including printing systems for printing on the outer surface of the adhesive tape, according to the invention, will become more apparent from the following disclosure, with reference to the accompanying drawings, where a preferred embodiment of the invention is shown by way of an indicative but not limitative example.

In the drawings.

DESCRIPTION OF THE PREFERRED EMBODIMENTS

Figure 1:
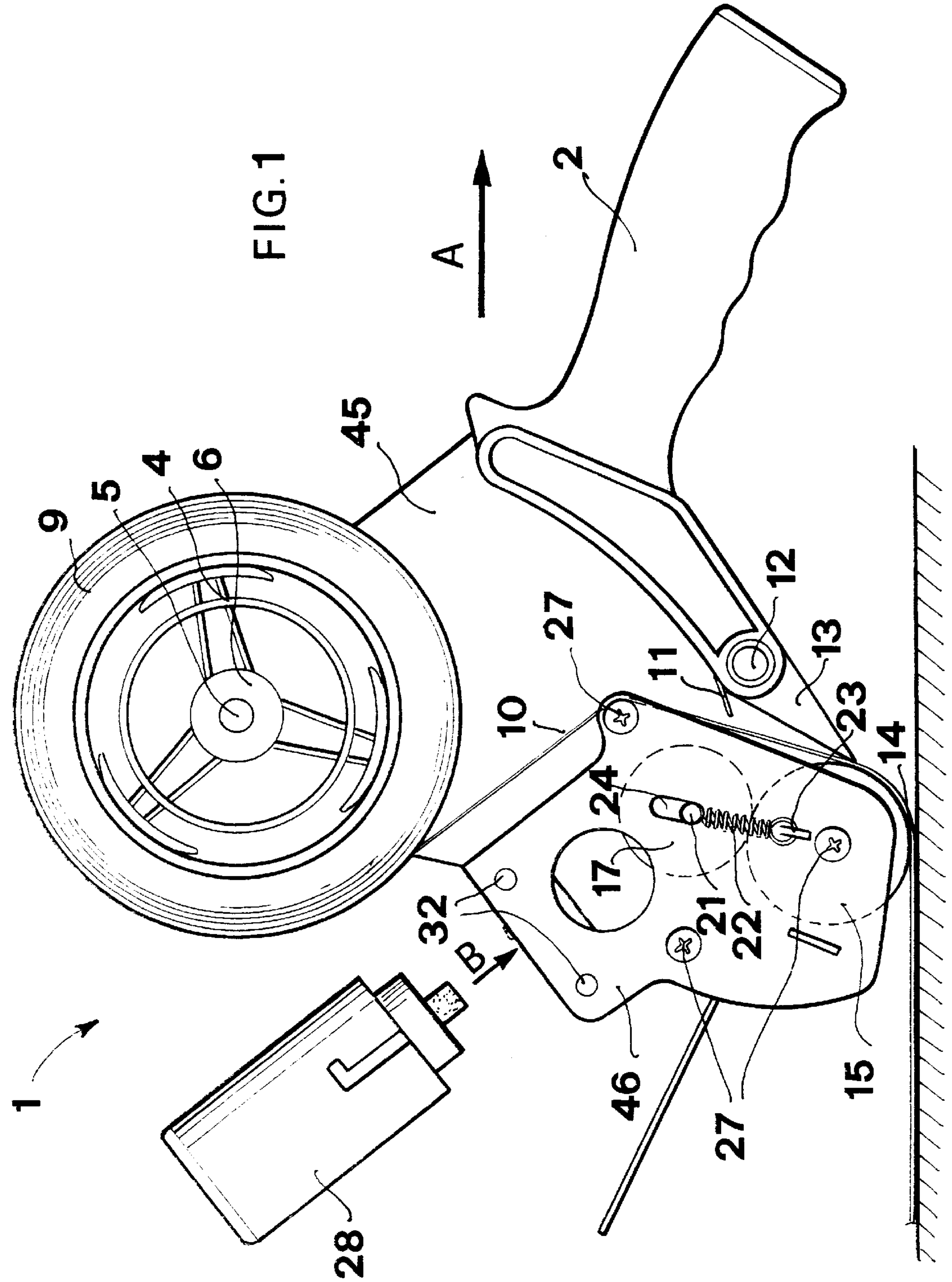
FIG. 1 is a side view of the improved adhesive tape applying device, including printing systems for printing on the outer surface of the tape, according to the invention.
Figure 2:
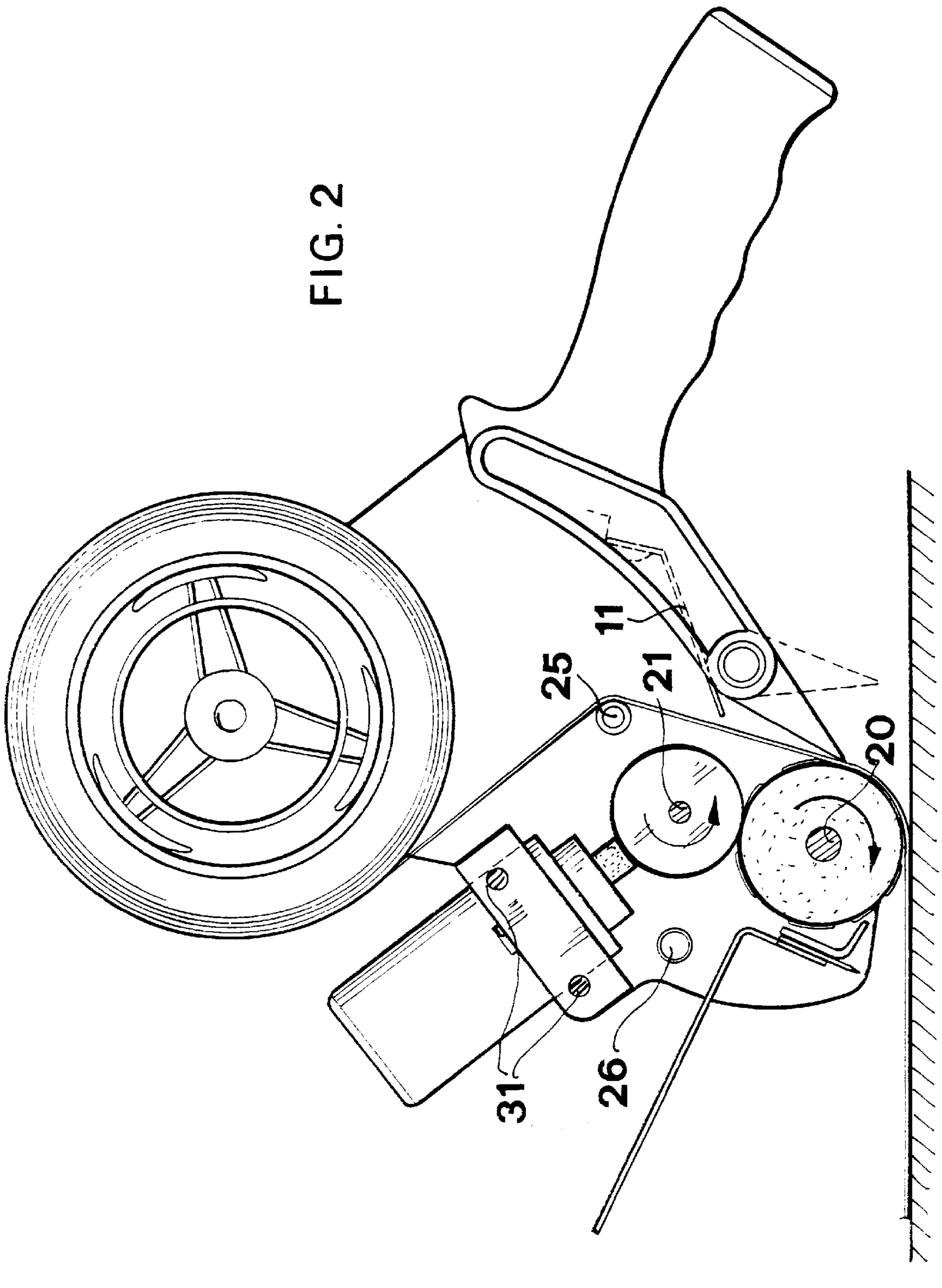
FIG. 2 is a partially cross-sectioned side view of the device shown in FIG. 1, during the operation thereof.
Figure 3:
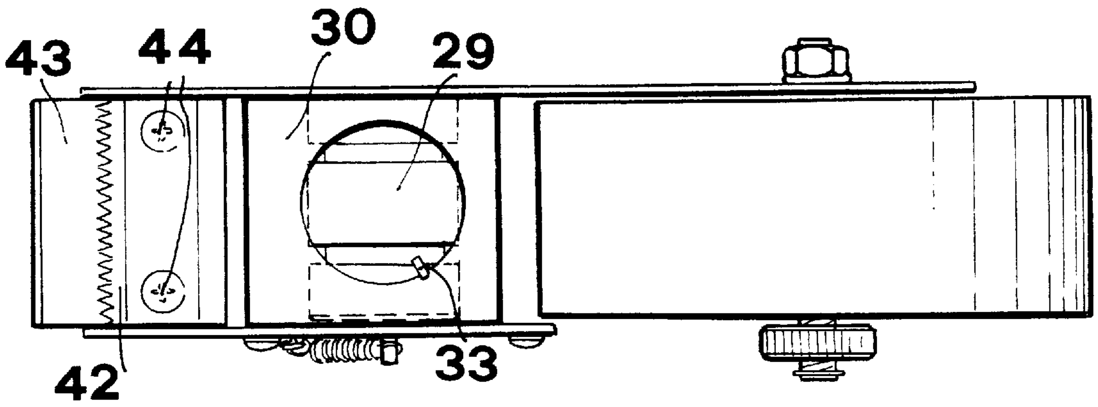
FIG. 3 is a top plan view of the device shown in FIG. 1.
Figure 4:
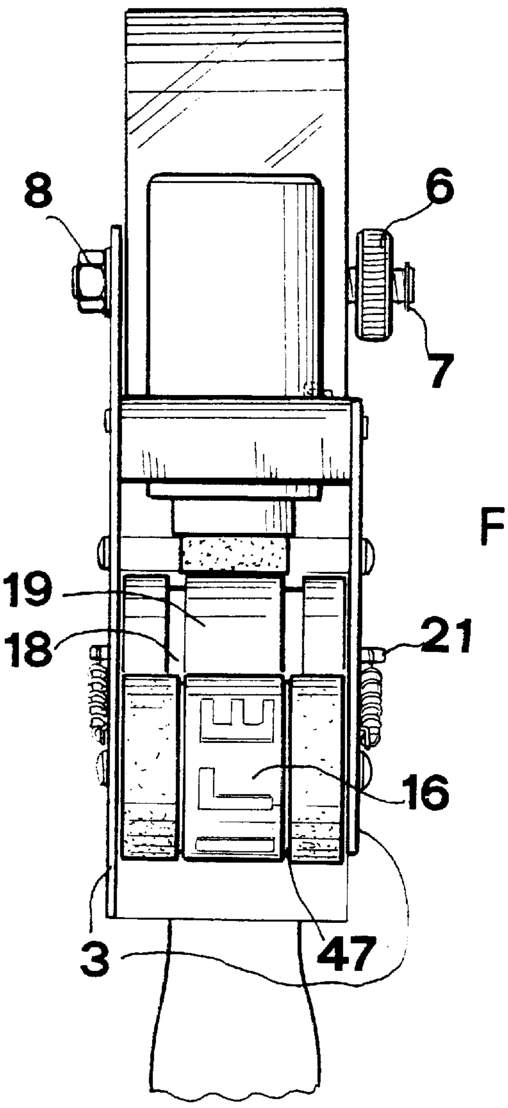
FIG. 4 is a partially cross-sectioned top plan view of the device shown in FIG. 1, in a ready for operation condition.
Figure 5:
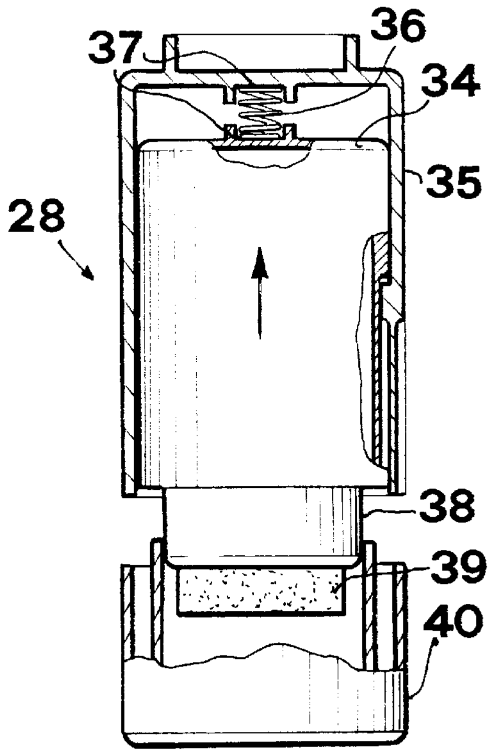
FIG. 5 is a partially cross-sectioned perspective view of inking means included in the device according to the invention.
Figure 6:
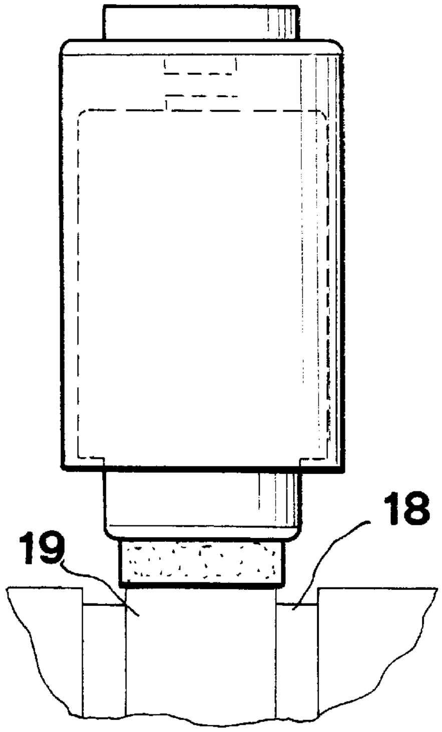
FIG. 6 is a side view of the inking means shown in FIG. 5, during the operation thereof.
Figure 7:
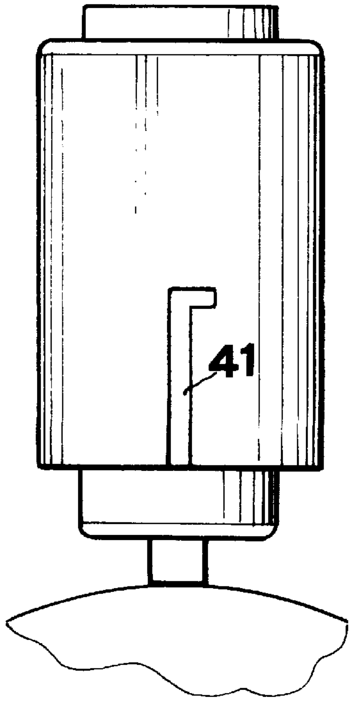
FIG. 7 is a further side view of the inking means shown in FIG. 5.

With reference to the number references of FIGS. 1, 2 and 4, the improved adhesive tape application device 1, including printing systems for printing on the outer surface of the adhesive tape, according to the invention, comprises a handle 2 laterally coupled, along the top base thereof, to a frame 3, by means of three screws 12, of which only one has been shown in the Figures.

The frame 3 can be advantageously split into two plates 45, 46, the larger plate 45 being directly connected to the handle 2, whereas the smaller plate 46 is mechanically coupled to the plate 45.

A first connection is performed by a pin 26 passing through the plates 45, 46 and fixed to said plates by a pair of screws 27.

The plate 45 supports, near the top thereof, a supporting element 4, adapted to support an adhesive tape roller 9. Said supporting element 4 is keyed on a pin 5 provided with threaded ends and coupled to the plate 45 by a ring nut 8.

At the opposite end, the supporting element 4—adhesive tape roll 9 assembly is affixed to the pin 5 by a threaded element 6, provided with a side knurled surface, to be firmly gripped by an operator as a new adhesive tape roll is clamped in position or as an exhausted adhesive tape roll is disengaged for replacement. The mentioned threaded element 6 is locked by a locking element 7, arranged outside the element 6.

The adhesive tape roll 9, in its condition mounted on the device 1 according to the invention, can turn to unwind the adhesive tape 10. The path of the adhesive tape 10 inside the device 1 will be defined by a pin 25, a metal tongue 11, a door element 13 and a pressing roller 15.

Said pin 25, parallel to the pin 26, and arranged between the plates 45 and 46 of the frame 3, in order to substantial modify the adhesive tape 10 path, is held in its desired position by screws 27 and, inter alia, contributes to the connection of said plates 45 and 46.

The metal tongue 11, operating as an anti-adhesion and supporting element, is firmly affixed on the handle 2 by a set screw or equivalent mechanical means, not shown in the Figures.

The door 13, pivoted to the front end of the handle 2, can downwardly turn and, together with the pressing roller 15, defines the adhesive tape to outlet slot.

The pressing roller 15 is held in its set position, with respect to the frame 3, by a pin 20, advantageously parallel to the pin 25, fixed by screws 27 to the plates 45, 46 of the above mentioned frame 3.

Said pin 20 constitutes both the rotary axis of the pressing roller 15 and a further coupling means of the plates 45, 46.

The pressing roller 15 comprises, on the side surface thereof, a central slot or groove 47, for housing therein a different printing plate or cliché 16, depending on requirements. Said printing plate, in particular, is made by any known methods conventionally used for making stamps, and is firmly held in said slot of the pressing roller 15 by known adhesive means which can be simply removed, if it is necessary to replace the mentioned printing plate 16.

The pressing roller 15 is always held in contact with an inking roller 17, coupled to the frame 3 by a pin 21 parallel to the pins 20, 25, 26, and connected to the plates 45, 46 by two slots 24, allowing said pressing roller to be displaced in parallel to said pins 20, 25, 26.

The above mentioned contact is assured by a pair of springs 22, each of which is anchored to an outer latching point 23, as symmetrically provided both on the plate 45 and plate 46, and at one end of the pin 21.

With reference to the number references of FIGS. 3, 5, 6, 7, the plates 45, 46 are each provided, above said inking roller 17, with two holes 32, which are mutually symmetrically arranged. Said holes 32 are adapted to receive therein four pins 31 pertaining to a plate 30, which is thereby coupled to the frame 3.

The plate 30 is provided with a central hole 29, allowing an outer ink tank 28 to be housed in the frame 3, while contacting the inking roller 17, in any operating conditions. More specifically, a projection 33, as formed on the edge of the holes 29, will allow said tank 28 to be bayonet-like engaged, since said tank is provided with a suitable L-shape outer slot 41.

The ink tank 28 is advantageously of cylindrical configuration and comprises an outer body 35 enclosing an inner body 34 which can be freely vertically displaced. Said inner body 34 is held coupled to the body 35 by a spring 36 which is coupled to two symmetrical recesses 37 arranged one in front of the other, i.e. one on the bottom inner surface of the outer body 35 and the other on the bottom outer surface of the inner body 34.

The inner body 34 is provided, at the end portions thereof, with a supporting element 38, also of cylindrical configuration, which supports a dispenser 39.

The ink being used is similar to that conventionally used for marking pens and has such a viscosity and volatility characteristics preventing blurred printings from being formed, while assuring a quick air drying.

The dispenser is made of a not-woven cloth of synthetic nature and having absorbing characteristics adapted to provide, up to exhaustion of the tank 28, an even supplying of ink to the inking roller 17.

Finally, a plug 40, also made of an inner body encompassed by an outer body, is provided for tightly closing, after use, the tank 28, upon disengaging it from the frame 3, thereby preventing the dispenser 39.

For cutting the adhesive tape 10 at the end of the application, between the plates 45 and 46 are provided a cutter 42 and a plastic supporting element 43. The cutter 42 is fixedly engaged, at the end portions thereof, between said plates 45, 46 by two holes each of which is symmetrically arranged for each plate. The mentioned cutter 42 is simultaneously fixed to said plastic supporting element 43 by two screws 44 overlaying said cutter.

The operation of the device 1 according to the invention is rather simple. Upon having selected the printing to be provided on the adhesive tape during the application of the latter of any desired type of packages, the corresponding printing cliché 16 is mounted on the pressing roller 15.

Then, the pressing roller 15 and related pin 20 are fixed by the screws 27 to the frame 3.

With specific reference to the number references of FIG. 1, it should be apparent that an ink tank 28 holding therein a preset color ink is opened and engaged, as indicated by the arrow "B", through the hole 29, in the frame 3, while causing the slot 41 laterally provided on the tank 28 to engage with the projection or lug 33 formed laterally of the hole 29. Upon having engaged and affixed, by the L-shape contour of the slot 41, said tank 28, the dispenser 39 will contact the inking surface 19 of the inking roller 17.

Then, a tape 9, either clear or colored, is arranged on the pin 5 and successively affixed to the frame 3 by the fixing element 6 and locking element 7. Then the adhesive tape 10 will be manually unwound and caused to pass under the pin 25 and then above the tongue 11 and between the door 13 and pressing roller 15.

The thus obtained arrangement of the adhesive tape 10 will allow the outer surface of said adhesive tape, i.e. the surface thereof devoid of adhesive, to contact the pressing roller 15.

Then, the handle 2 of the device 1 is gripped by causing the pressing roller 15, which is now arranged above the end portion of the adhesive tape 10, to contact the package or pack to be closed or marked at the application point 14.

As the pressing roller 15 is rotatively translated in the direction of the arrow "A", it will in turn cause the inking roller 17 to turn in an opposite direction.

Then, the inking roller 17, always contacting the pressing roller 15 and dispenser 39, will apply ink to the printing plate 16 which, by contacting the outer surface of the adhesive tape 10, being supplied by the handle 2, will indelibly print the desired printing on the surface of the adhesive tape 10 devoid of adhesive.

The cutting of the tape will be performed as in prior adhesive tape applying or dispensing devices.

The plastic supporting element 43 will held the adhesive tape 10 in a tensioned condition, while the cutter 42 will cut the adhesive tape by a rotary movement transmitted by the handle 2 to the device 1.

Finally, it should be apparent that the specific design of the device 1 according to the invention, will allow the device to operate without tape even on different surfaces, such as those of storing counters or shelvings, thereby allowing the user to mark by the most suitable prints those regions which usually require marking labels.

While the invention has been disclosed and illustrated with reference to preferred embodiments thereof, it should be apparent that the disclosed embodiments are susceptible to many modifications and variations all of which will come within the spirit and scope of the appended claims.

I claim:

1. An improved adhesive tape applying device, including printing systems for printing on an outer surface of an adhesive tape, comprising a handle coupled to a frame, bearing a supporting element for an adhesive tape roll and cutting means for cutting said adhesive tape, and defining a path of said adhesive tape toward an application point thereof, characterized in that at least a pressing roller is provided above said application point, said pressing roller contacting an outer adhesive free surface of said adhesive tape, being provided on an outside thereof with printing characters and being suitable inked by inking means supported by said frame.

2. An improved adhesive tape applying device, including printing systems for printing on an outer surface of said adhesive tape, according to claim 1, characterized in that said frame comprises two plates, one of said plates, of larger size, being directly coupled to said handle and supporting said adhesive tape roll, and the other plate, of smaller size, being coupled to said handle by mechanical coupling elements.

3. An improved adhesive tape applying device, including printing systems for printing on an outer surface of said adhesive tape, according to claim 1, characterized in that said pressing roller comprises, on a side surface thereof, a central slot thereon is removably affixed a printing plate.

4. An improved adhesive tape applying device, including printing systems for printing on an outer surface of said adhesive tape, according to claim 1, characterized in that said inking means comprise at least an inking roller and at least an ink tank.

5. An improved adhesive tape applying device, including printing systems for printing on an outer surface of said adhesive tape, according to claim 1, characterized in that said adhesive tape cutting means comprise a cutter and a supporting element, said cutter being fixedly engaged, at end portions thereof, to said frame by two slots provided on said frame, said supporting element being coupled by screws to said cutter.

6. An improved adhesive tape applying device, including printing systems for printing on an outer surface of said adhesive tape, according to claim 2, characterized in that said plates forming said frame are coupled by at least a pin passing through said plates and being fixed by screws, said larger size plate being provided with a pin having threaded ends, fixed at one end thereof by a bolt on which is arranged a supporting element for an adhesive tape roll, said supporting element being affixed on said pin by a fixing element and a locking element.

7. An improved adhesive tape applying device, including printing systems for printing on an outer surface of said adhesive tape, according to claim 3, characterized in that said pressing roller is coupled to said frame by a pin having two pin ends fixed by screws to said frame, said pin constituting a rotary axis for said pressing roller.

8. An improved adhesive tape applying device, including printing systems for printing on an outer surface of said adhesive tape, according to claim 4, characterized in that said inking roller is provided, on a side surface thereof, with a recess on which an inking surface is arranged, said inking roller including an inking roller pin coupled to said frame by slots provided on said frame, so as to be driven parallel to said pressing roller and tangentially to said ink tank, said inking roller pin being further coupled to said frame by two coupling springs joining the ends of said inking roller pin to anchoring points as provided on said frame.

9. An improved adhesive tape applying device, including printing systems for printing on an outer surface of said adhesive tape, according to claim 4, characterized in that said ink tank is provided with an inner body encompassed by an outer body, said inner body being adapted to be driven while being held connected to said outer body by a spring coupled to two mutually symmetrical recesses, one provided on an inner face of a bottom base of said outer body, and the other provided on a bottom outer face of said inner body, said inner body including on a top thereof a cylindric supporting element housing an ink dispenser, said cylindric supporting element housing therein a tightly sealing plug.

10. An improved adhesive tape applying device, including printing systems for printing on an outer surface of said adhesive tape, according to claim 6, characterized in that said adhesive tape passes through said frame under a pin parallel to said pressing roller and fixed on said frame, and arrives at the application point thereof upon passing above a tongue fixed to said handle and through a slot formed by said pressing roller and a door pivoted to said handle, said pressing roller being in contact with the surface of said adhesive tape devoid of adhesive.

11. An improved adhesive tape applying device, including printing systems for printing on an outer surface of said adhesive tape, according to claim 9, characterized in that said ink tank comprises an outside L-shape slot provided for engaging with a projection formed on a plate coupled to said frame, said plate being designed to support said ink tank while holding said ink dispenser tangential to said inking roller.

12. An improved adhesive tape applying device, including printing systems for printing on an outer surface of said adhesive tape, according to claim 11, characterized in that said plate is provided with a central hole and is coupled to said frame by pins engaged in holes correspondingly formed on said frame.

* * * * *